United States Patent
Moriya

(10) Patent No.: US 8,419,963 B2
(45) Date of Patent: Apr. 16, 2013

(54) POLISHING METHOD

(75) Inventor: Tsuyoshi Moriya, Tokyo (JP)

(73) Assignee: Tokyo Electron Limited, Tokyo (JP)

( * ) Notice: Subject to any disclaimer, the term of this patent is extended or adjusted under 35 U.S.C. 154(b) by 151 days.

(21) Appl. No.: 13/031,674

(22) Filed: Feb. 22, 2011

(65) Prior Publication Data

US 2011/0204024 A1 Aug. 25, 2011

(30) Foreign Application Priority Data

Feb. 23, 2010 (JP) ................................ 2010-037398

(51) Int. Cl.
- B44C 1/22 (2006.01)
- C03C 25/68 (2006.01)
- C03C 15/00 (2006.01)
- C23F 1/00 (2006.01)

(52) U.S. Cl.
USPC .............................................. 216/89; 216/38

(58) Field of Classification Search .............. 216/89, 216/38
See application file for complete search history.

(56) References Cited

U.S. PATENT DOCUMENTS

| | | | | |
|---|---|---|---|---|
| 5,861,055 A | * | 1/1999 | Allman et al. | 106/3 |
| 6,815,676 B2 | * | 11/2004 | Shirai et al. | 850/12 |
| 2009/0233192 A1 | * | 9/2009 | Otsuka et al. | 430/5 |

FOREIGN PATENT DOCUMENTS

| | | |
|---|---|---|
| JP | 10-12547 A | 1/1998 |
| JP | 2004-310067 A | 11/2004 |
| JP | 2008-156215 A | 7/2008 |
| KR | 10-2009-0092092 A | 8/2009 |

* cited by examiner

*Primary Examiner* — Roberts Culbert

(74) *Attorney, Agent, or Firm* — Nath, Goldberg & Meyer; Jerald L. Meyer

(57) ABSTRACT

A defect distribution in the vicinity of a surface of a glass substrate is inspected by a positron annihilation gamma ray measurement. A buffer layer including a brittle layer and/or a coating layer is created on the surface of the glass substrate. The brittle layer is formed by irradiating a gas cluster ion on the surface to deteriorate the glass. The coating layer is formed by coating the surface with a soft substance. Next, a thickness of the created buffer layer is measured by a positron annihilation gamma ray measurement. The surface of the glass substrate is then cleaned. To create a slurry, abrasive particles for the slurry are uniformly scattered on a polishing implement for polishing the glass substrate and a liquid component for the slurry is added thereto. The glass substrate is then chemically mechanically polished from the buffer layer with the slurry.

7 Claims, 6 Drawing Sheets

FIG. 4
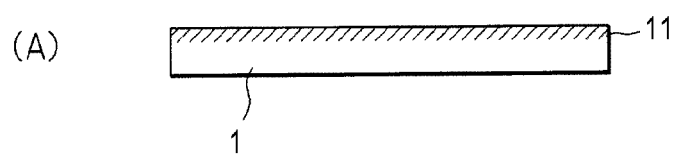
(A)
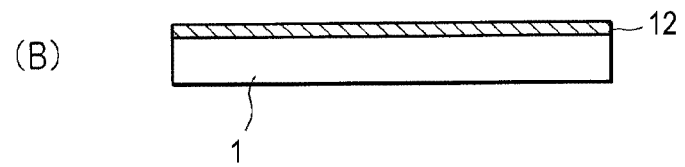
(B)
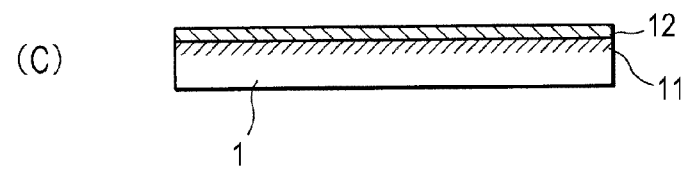
(C)

POLISHING METHOD

CROSS-REFERENCE TO RELATED APPLICATIONS

This application is based upon and claims the benefit of priority from Japanese Patent Application No. 2010-037398, filed on Feb. 23, 2010, the entire contents of which are incorporated herein by reference.

TECHNICAL FIELD

The present disclosure relates to a method of polishing glass using chemical mechanical polishing.

BACKGROUND

Circuit patterns on electronic components such as a semiconductor element are made by using an exposure technology, for example, by reductively projecting a negative circuit pattern formed on a photo mask to a silicon wafer. To promote miniaturization of electronic components, the wavelength of light used in exposure technology becomes shorter and shorter. Recently, an EUV exposure technology using an EUV (Extreme Ultraviolet) light as the exposure light has been developed. A photo mask for the EUV exposure is structured such that a multi-layered film including metal and a semiconductor for reflecting EUV light is provided on a mask blank (substrate material) and a negative circuit pattern including a light absorber is formed on the multi-layered film. A mask blank is manufactured by chemical mechanical polishing (CMP) of a glass substrate. Defects on a surface of a mask blank cause defects in a multi-layered film and lead to deterioration in precision of a negative circuit pattern. Accordingly, when manufacturing the mask blank by means of CMP, there is a need to prevent the defects, if possible. In this regard, Japanese Laid-Open Patent Publication No. 2004-310067 discloses a technology of measuring a surface contour of a glass substrate before a polishing process and performing a process of improving the flatness of the surface of the glass substrate based on the measurement result.

SUMMARY

The CMP is performed by using a polishing liquid (referred to as a slurry in the art) that contains abrasive particles for polishing a glass substrate. One factor associated with defects found on the surface of a glass substrate is that the abrasive particles contained in the slurry cause scratches on the surface of the glass substrate during polishing. As an approach of suppressing the generation of the scratches, it may be considered to reduce the particle diameters of the abrasive particles. However, this approach is problematic in that the polishing rate decreases and the time necessary to manufacture mask blanks increases.

Thus, in light of the foregoing, it is an object of some embodiments disclosed herein to provide a polishing method of performing appropriate pre-treatments to glass to suppress the generation of the scratches as well as the prolongation in the time necessary for polishing.

According to the present disclosure, there are provided embodiments of a polishing method. In one embodiment, the polishing method chemically mechanically polishes glass using a slurry containing abrasive particles for polishing the glass and a liquid component. The polishing method includes: creating a buffer layer on a surface of the glass, the buffer layer being easier to polish by the slurry than the glass; and chemically mechanically polishing the glass from the created buffer layer.

According to another embodiment, when polishing the glass, the buffer layer which is easier to be polished than the glass is created on the surface of the glass and a CMP of the glass is carried out on the buffer layer.

In one embodiment, said creating the buffer layer includes creating a brittle layer that is formed by irradiating a gas cluster ion on the surface of the glass to deteriorate a vicinity of the surface of the glass.

According to another embodiment, the brittle layer, which is formed by irradiating the gas cluster ion on the surface of the glass to deteriorate the vicinity of the surface of the glass, is created as the buffer layer.

In yet another embodiment, said creating the buffer layer includes creating a coating layer, which is formed by coating the surface of the glass with a substance softer than the glass by a thickness equal to or greater than a particle diameter of the abrasive particle within the slurry.

According to an alternate embodiment, the coating layer, which is formed by coating the surface of the glass with the substance softer than the glass, is created as the buffer layer.

In one embodiment, the polishing method further includes inspecting a distribution of defects residing in the vicinity of the surface of the glass by a positron annihilation gamma ray measurement prior to said creating the buffer layer.

According to another embodiment, the defect distribution ranging from the surface of the glass up to a certain depth in the vicinity of the surface is inspected before creating the buffer layer by the positron annihilation gamma ray measurement.

In yet another embodiment, the polishing method further includes measuring a thickness of the buffer layer by a positron annihilation gamma ray measurement after said creating the buffer layer.

According to an alternate embodiment, the thickness of the created buffer layer is measured by the positron annihilation gamma ray measurement.

In one embodiment, the polishing method further includes creating the slurry by uniformly scattering the abrasive particles on the buffer layer or a polishing implement for polishing the glass and then adding the liquid component to the scattered abrasive particles.

According to another embodiment, the abrasive particles are uniformly scattered on the buffer layer or the polishing implement and then the liquid component is added, thereby creating the slurry. The glass is polished using the created slurry.

BRIEF DESCRIPTION OF THE DRAWINGS

FIG. 4 is a schematic sectional view illustrating a glass substrate with a buffer layer created therein.

DETAILED DESCRIPTION

Embodiments will now be described in detail with reference to the accompanying drawings.

Figure 1:
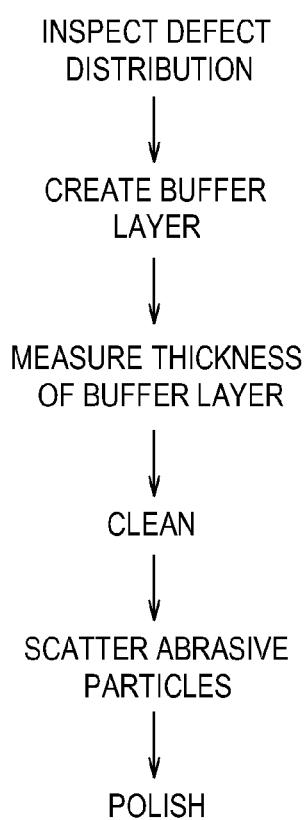
FIG. 1 is a conceptual diagram showing example processes of a polishing method.

FIG. 1 is a conceptual diagram showing example processes of a polishing method. First, a defect distribution in the vicinity of a surface of a polishing target object (glass substrate) is inspected by a positron annihilation gamma ray measurement. Next, a buffer layer that is easier to polish than glass is created on the surface of the glass substrate. Thereafter, a thickness of the created buffer layer is measured by a positron annihilation gamma ray measurement. Next, the surface of the glass substrate is cleaned. Further, abrasive particles for a slurry are scattered and a liquid component for the slurry is added. Thereafter, the glass substrate is polished from the buffer layer by CMP (Chemical Mechanical Polishing). Hereinafter, detailed descriptions will be provided on each process of the polishing method.

Figure 2:
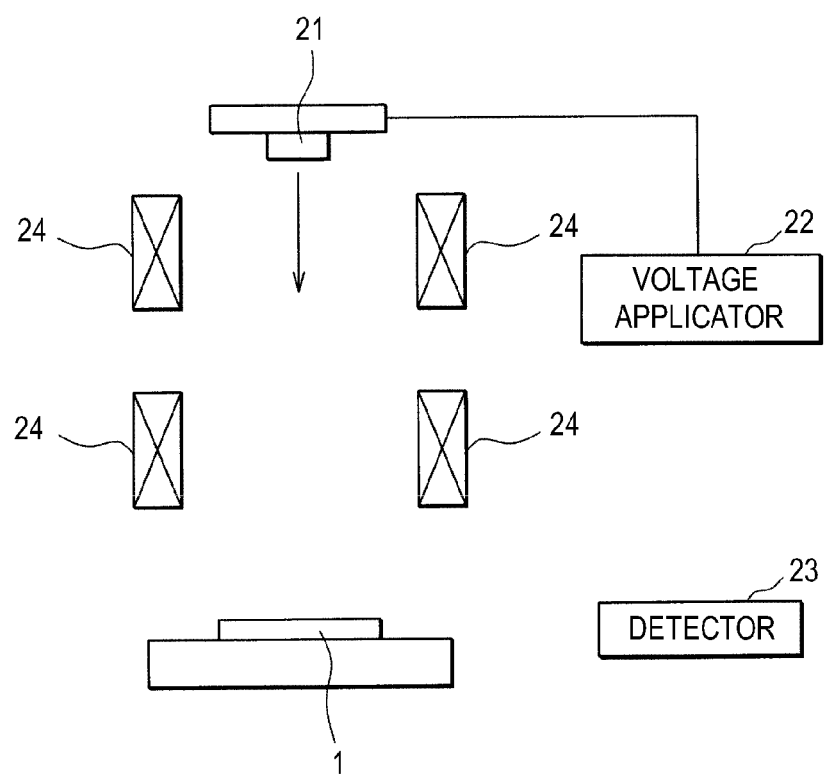
FIG. 2 is a schematic diagram showing an example of a positron annihilation gamma ray measurement apparatus.

A process of inspecting a defect distribution in the vicinity of the surface of the glass substrate will be described first. In the process of inspecting the defect distribution, a distribution of cavity-shaped or void defects residing in the vicinity of the surface of the glass substrate is inspected. FIG. 2 is a schematic diagram showing an example of a positron annihilation gamma ray measurement apparatus. The positron annihilation gamma ray measurement apparatus is configured to control a trajectory of positrons from a 22 Na positron source 21 by means of a plurality of coils 24 and to irradiate the positrons to the surface of the glass substrate 1. An arrow in FIG. 2 indicates an irradiation direction of the positrons. The positron annihilation gamma ray measurement apparatus includes a voltage applicator 22 for applying a voltage to the positron source 21. The voltage applicator 22 applies the voltage to the positron source 21 to control an irradiation energy of the positrons. Alternatively, a positron generating device may include a device configured to collide with a particle beam of electrons radiated from an accelerator such as a linac (linear accelerator) with a tungsten target to generate positrons. Further, the positron annihilation gamma ray measurement apparatus includes a detector 23 for detecting a gamma ray. The detector 23 detects a gamma ray that is generated when the irradiated positrons are annihilated in the vicinity of the surface of the glass substrate 1.

The positrons irradiated to an object are annihilated in pairs with the electrons within the object to thereby generate gamma rays. An energy distribution of the generated gamma rays varies depending upon a defect density within the object. The energy distribution of the gamma rays can be represented as an S parameter that is a value obtained by dividing a predetermined area including the peak of the energy distribution by an entire area. In general, the greater the defects are or the higher the defect density is, the greater the S parameter will be. Further, the greater the irradiation energy becomes, the deeper the positrons irradiated to an object will penetrate into the object. Accordingly, a defect distribution ranging in a depth direction from the surface of the glass substrate 1 can be evaluated by irradiating the positrons into the glass substrate 1 under the control of the irradiation energy and then computing the S parameter corresponding to each irradiation energy based on the detection results of the gamma rays from the detector 23. Compared to conventional surface inspection methods such as a method using an electron microscope, more detailed information on the defect distribution can be obtained.

In the process of inspecting the defect distribution, the existence of the defects ranging from the surface of the glass substrate 1 up to a particular depth is inspected by the positron annihilation gamma ray measurement. Where a size, depth or density of defects, which are judged to exist in the vicinity of the surface of the glass substrate 1 through the inspection, exceeds a permissible range, the glass substrate 1 with such defects is destroyed. Where defects that can be eliminated through polishing exist in the vicinity of the surface of the glass substrate 1, then a polishing depth is determined for polishing the glass substrate 1 in a polishing process described below so that the glass can be abraded off up to the depth where the defects exist. By virtue of using the positron annihilation gamma ray measurement, it is possible to inspect the defects existing in the surface of the glass substrate 1 as well as the defect distribution ranging up to a depth where the positrons in the vicinity of the surface can penetrate. Since the glass substrate 1 with the defects exceeding the permissible range is destroyed, inferior workpieces can be excluded prior to beginning the polishing process. Further, since the polishing depth is determined so that the glass can be abraded off up to the depth where the defects exist, defectless mask blanks can be manufactured with good efficiency.

Next, descriptions will be continued on a process of creating a buffer layer on the surface of the glass substrate. The buffer layer is easier to polish than glass. The buffer layer functions to absorb impact caused by an initial polishing with a slurry and to adapt the slurry to the glass substrate. In the process of creating the buffer layer, a brittle layer or a coating layer may be created as the buffer layer. The brittle layer is formed by irradiating a gas cluster ion to deteriorate the vicinity of the surface of the glass substrate. The coating layer is formed by coating the surface of the glass substrate with a material softer than glass.

Figure 3:
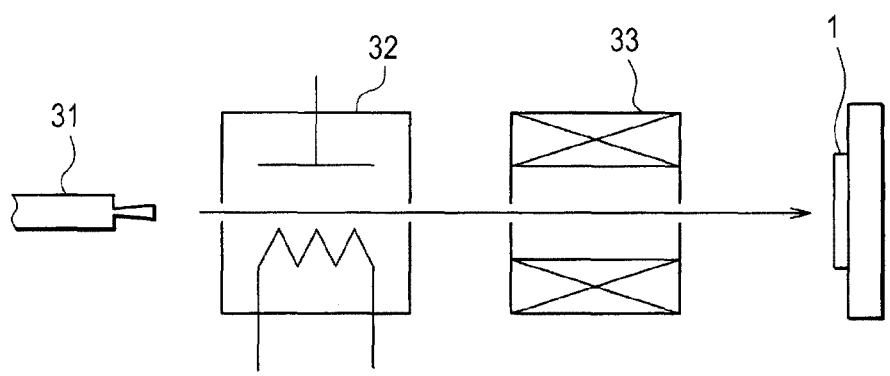
FIG. 3 is a schematic diagram showing an example configuration of a gas cluster ion irradiating apparatus for creating a brittle layer.

FIG. 3 is a schematic diagram showing an example configuration of a gas cluster ion irradiating apparatus for creating the brittle layer. A gas cluster means a cluster in which about one thousand gas molecules such as argon gather together. The gas cluster ion may be obtained by ionizing the gas cluster. The gas cluster ion irradiating apparatus includes a nozzle 31 for ejecting a high-pressure material gas in a vacuum. If the material gas is ejected from the nozzle 31, then a gas cluster in which gas molecules gather is created. Further, the gas cluster ion irradiating apparatus includes an ionizer 32 for ionizing the gas cluster by colliding electrons with the gas cluster. The ionizer 32 refines the gas cluster ion by ionizing the gas cluster. Further, the gas cluster ion irradiating apparatus includes an accelerator 33 for accelerating the gas cluster ion by means of an electric field and a magnetic field. The accelerator 33 irradiates the gas cluster ion to the glass substrate 1 by accelerating the gas cluster ion and controlling a trajectory of the gas cluster ion by means of an electric field and a magnetic field. An arrow in FIG. 3 indicates the trajectory of the gas cluster ion.

The gas cluster ion irradiated to the glass substrate 1 penetrates into the glass substrate 1 from the surface thereof up to a depth of several tens of nanometer (nm) to thereby deteriorate glass. As a result, the vicinity of the surface, which ranges from the surface of the glass substrate 1 up to the depth of several tens of nanometer, deteriorates due to the irradiation of the gas cluster ion and thus becomes the brittle layer. The material gas for the gas cluster ion may include all gases including argon, oxygen or nitrogen. The material gas including rare gases may be more suitable in that it can reduce reactivity between a rare gas and glass and further prevent the glass from being modified up to a portion more inward than the brittle layer due to chemical reaction.

In the polishing process described below, the glass substrate 1 is polished from the brittle layer and the brittle layer is finally abraded off through the polishing process. Since the gas cluster ion irradiation deteriorates a stiffness of the brittle layer, the brittle layer can be polished easier than glass. If defects reside in the vicinity of the surface of the glass substrate 1, the glass substrate must be polished up to the depth where the defects are completely eliminated. In this regard, the brittle layer is created so as to contain a portion in which the defects exist. This can reduce the time necessary for the polishing process. Further, abrasive particles contained in the slurry may cause scratches on the brittle layer during the polishing process. However, since the brittle layer is finally abraded off, mask blanks to be obtained by polishing the glass substrate 1 have no scratches. In other embodiments, the brittle layer creating process may be performed in a manner that a thickness of the brittle layer is adjusted by controlling the acceleration of the gas cluster ion so that the brittle layer can include the position of the defects detected through the defect distribution inspecting process.

In one embodiment, a gas that is highly reactive to glass (e.g., fluorine) may be used as the material gas for the gas cluster ion. When fluorine is used as the material gas for the gas cluster ion, fluorine remains in the glass substrate 1 and reacts with water within the slurry to produce fluoric acid during the polishing process. Then, the fluoric acid chemically reacts with glass and a chemical polishing develops thereby. Thus, the polishing process can be performed with better efficiency. When the gas highly reactive with glass is used as such, it is preferable in some embodiments to dilute the gas with other gas having a low reactivity with glass in order not to modify glass excessively (e.g., by using a mixed gas of 95% argon and 5% fluorine).

In another embodiment, the buffer layer creating process may be performed in a manner of creating a coating layer as the buffer layer. The coating layer is obtained by coating the surface of the glass substrate with a material softer than glass. In the embodiment wherein the coating layer is created as the buffer layer, the coating layer may be created on the surface of the glass substrate 1 by using a vacuum process such as a plasma CVD (Chemical Vapor Deposition), a thermal CVD or a sputtering process. In other embodiments, the coating layer may be created by coating the surface of the glass substrate 1 with a liquid material by spin coating or spray coating and thereafter curing the liquid material. A material for the coating layer may include a material that is easier to be polished and softer than glass (e.g., an organic film such as a resist, a polymer such as fluoric resin, amorphous silica, etc.).

In the polishing process described below, the glass substrate 1 is polished from the coating layer and the coating layer is finally abraded off through the polishing process. In an initial stage of the polishing process, the abrasive particles contained in the slurry are sharp and have a greater particle diameter. Thus, such abrasive particles are prone to make scratches. However, as the coating layer is polished more and more, the abrasive particles become blunt and have a smaller particle diameter. Accordingly, when polishing the surface of the glass substrate 1 by abrading off the coating layer, it is difficult for the abrasive particles to make scratches on the glass substrate 1. Further, the coating layer is softer than glass and absorbs the impact applied from the abrasive particles within the slurry in the initial stage of the polishing process, thereby preventing scratches from being caused on the glass substrate 1.

In one embodiment, a thickness of the coating layer may be equal to or greater than the particle diameter of the abrasive particles that is contained in the slurry used in the polishing process. The thickness of the coating layer is equal to or greater than the particle diameter of the abrasive particles, thereby preventing the abrasive particles from protruding through the coating layer to make scratches on the glass substrate 1 in the initial stage of the polishing process. Further, the thickness of the coating layer may be equal to or less than ten times the particle diameter of the abrasive particles (at maximum, equal to or less than 1000 nm). The thickness of the coating layer is equal to or less than ten times of the particle diameter of the abrasive particles or equal to or less than 1000 nm, thereby preventing prolongation in the time necessary for abrading off the coating layer in the polishing process.

In yet another embodiment, the buffer layer creating process may be performed by creating both the brittle layer and the coating layer as the buffer layer. In this embodiment, the brittle layer is created by irradiating the gas cluster ion to the glass substrate 1 and the coating layer is then created to be superposed on the brittle layer. FIG. 4 is a schematic sectional view illustrating the glass substrate 1 with the buffer layer created therein. FIG. 4(a) illustrates that the brittle layer 11 is created as the buffer layer. A surface layer of the glass substrate 1 is comprised of the brittle layer 11. FIG. 4(b) illustrates that the coating layer 12 is created as the buffer layer. The coating layer 12 is formed on the surface of the glass substrate 11. FIG. 4(c) illustrates that both the brittle layer 11 and the coating layer 12 are created as the buffer layer. A surface layer of the glass substrate 1 is comprised of the brittle layer 11 and the coating layer 12 is formed on the surface of the brittle layer 11. In the embodiment wherein both the brittle layer 11 and the coating layer 12 are created as the buffer layer, the coating layer 12 prevents the scratches from being caused on the glass substrate 1 and the brittle layer 11 reduces the time necessary for the polishing process.

Figure 5:
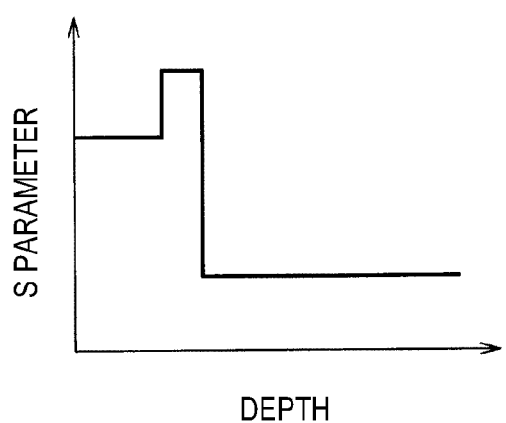
FIG. 5 is a schematic characteristic diagram illustrating a result from a positron annihilation gamma ray measurement in a process of measuring a buffer layer thickness.

Next, descriptions will be provided on a process of measuring a thickness of the created buffer layer. In the process of measuring the buffer layer thickness, the thickness of the buffer layer created on the glass substrate 1 is measured by a positron annihilation gamma ray measurement, similar to the process of inspecting the defect distribution. FIG. 5 is a schematic characteristic diagram illustrating the result from the positron annihilation gamma ray measurement in the process of measuring the buffer layer thickness. In FIG. 5, a horizontal axis indicates a depth from the surface of the glass substrate 1, while a vertical axis indicates a S parameter at each depth. FIG. 5 illustrates the result of performing the positron annihilation gamma ray measurement on the glass substrate 1 with the brittle layer 11 created therein. A value of the S parameter varies as follows: it is constant up to a certain depth from the surface of the glass substrate 1; then it increases; thereafter it sharply decreases at a particular depth; and it remains constant at a particular depth. As noted above, the greater the S parameter is, the larger the defects in the glass substrate 1 become and the higher the defect density becomes. A portion shallower than the particular depth (where the S parameter sharply decreases) has the S parameter greater than another portion deeper than the particular depth. Thus, the portion shallower than the particular depth may be referred to as the brittle layer 11 with great defects and a high defect density. Further, the particular depth where the S parameter sharply decreases is located at a boundary of the brittle layer 11 and thus a value of the particular depth may be referred to as the thickness of the brittle layer 11. Accordingly, the thickness of the created brittle layer 11 can be measured by performing the positron annihilation gamma ray measurement on the glass substrate 1 with the brittle layer 11 created therein and then evaluating the particular depth where the S parameter sharply decreases from, for example, the measurement result shown in FIG. 5.

In the embodiment wherein the coating layer 12 is created as the buffer layer, likewise, the process of measuring the buffer layer thickness is performed by measuring a thickness of the coating layer 12 by the positron annihilation gamma ray measurement. The glass substrate 1 and the coating layer 12 are different from each other in terms of a density, defect density and the value of the S parameter. Thus, the thickness of the coating layer 12 can be measured in the same manner. In the embodiment wherein both the brittle layer 11 and the coating layer 12 are created as the buffer layer, the thickness of the buffer layer can be measured in the same manner.

After measurement of the buffer layer thickness, a depth, up to which the glass substrate 1 is polished in the polishing process described below, is determined such that the buffer layer is abraded off in the polishing process. Consequently, it is possible to efficiently manufacture defectless mask blanks. In some embodiments, the polishing method may not include the process of measuring the buffer layer thickness by precisely controlling the thickness of the buffer layer in the buffer layer creating process.

Next, descriptions will be provided on a process of cleaning the surface of the glass substrate 1. In the cleaning process, the surface of the glass substrate 1 is cleaned by using a cleaner carrying out a cleaning operation by a steam cleaning method, a dry ice cleaning method, a Leidenfrost cleaning method or a brush cleaning method. The steam cleaning method blows steam to the surface of the glass substrate 1 to clean the glass substrate. The dry ice cleaning method blows dry ice to the surface of the glass substrate 1 to clean the glass substrate. The vaporization of the dry ice removes substances stuck on the surface. The Leidenfrost cleaning method heats the glass substrate 1 and rolls water droplets on the surface of the heated glass substrate 1 to remove the substances stuck on the surface by steam. The brush cleaning method wipes the surface by a brush to clean the glass substrate. The foreign substances stuck to the surface of the glass substrate 1 are removed through a cleaning process, thereby preventing foreign substances from causing scratches on the glass substrate 1, which can occur when polishing the glass substrate having foreign substances stuck thereto. Alternatively, the cleaner used in the cleaning process may be configured to clean the glass substrate 1 by using several cleaning methods. In some embodiments, to prevent the foreign substances from sticking to the glass substrate 1 again after the cleaning process, a cleaner may be provided within a polishing apparatus for performing the CMP. Further alternatively, an interior of the cleaner for performing the steam cleaning may be coated with titanium, silica or a fluoric resin such that metallic particles apt to stick to the glass substrate 1 cannot be generated.

Figure 6:
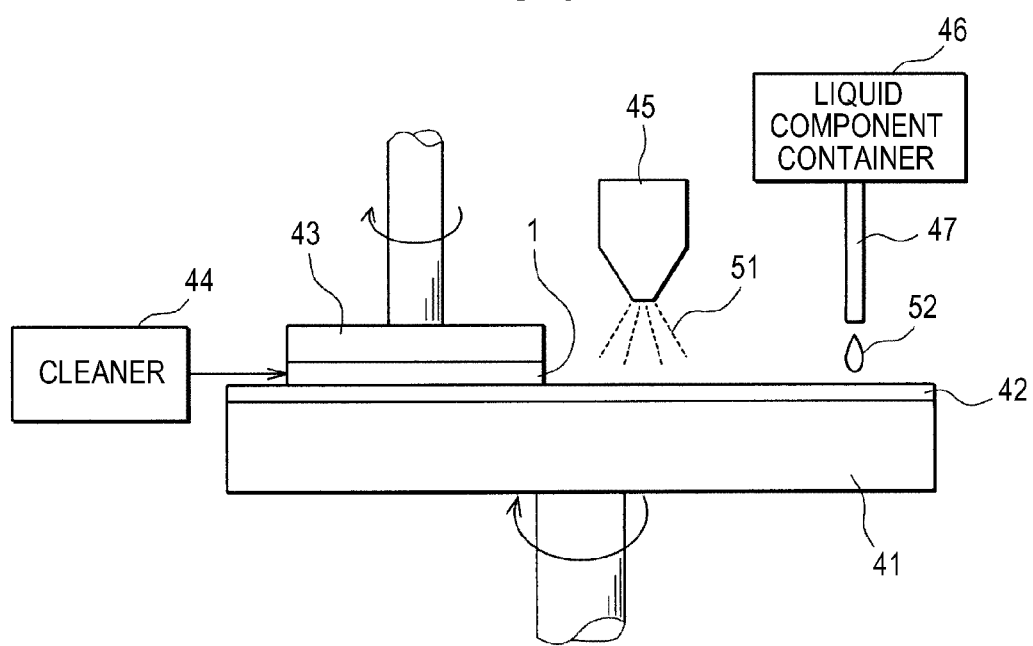
FIG. 6 is a schematic front view showing an example configuration of a polishing apparatus.

FIG. 6 is a schematic front view showing an example configuration of a polishing apparatus. The polishing apparatus includes a flat turn table 41. A polishing pad (polishing implement) 42 made from a resin material is laid on the turn table 41. Further, the polishing apparatus includes a holder 43 located opposite the polishing pad 42 and a cleaner 44. The holder 43 is capable of holding the glass substrate 1. Air within the polishing apparatus is conditioned clean. The cleaner 44 discharges the glass substrate 1 that undergoes the polishing process. The holder 43 holds the discharged glass substrate 1 located opposite the polishing pad 42.

Next, descriptions will be provided on a process of scattering abrasive particles for a slurry. In the scattering process, abrasive particles to be contained in a slurry (this slurry is used in the polishing process described below) are scattered in advance. The abrasive particles are fine particles comprised of a substance having a hardness harder than glass for mechanically polishing glass or a substance that chemically reacts with glass to chemically polish the glass. The abrasive particles include silica, alumina, titania (titanium dioxide) or ceria (cerium oxide). In one embodiment, a particle diameter of the abrasive particles may be not more than 100 nm. The polishing apparatus includes a scatterer 45 for uniformly scattering a large amount of the abrasive particles 51 on the polishing pad 42. The scatterer 45 sprays the abrasive particles 51 onto the polishing pad 42 in a form of aerosol in the air by an electrostatic spraying method and has the sprayed abrasive particles 51 stuck to the polishing pad 42, thereby uniformly scattering the abrasive particles. Alternatively, the scatterer 45 may scatter the abrasive particles 51 by a method other than the foregoing, for example, a method of applying a solution, wherein abrasive particles are dispersed in a particular solvent, on the polishing pad 42 and then vaporizing the solvent to thereby uniformly scatter the abrasive particles.

The polishing apparatus includes a liquid component container 46 for containing a liquid component for the slurry and a nozzle 47 connected to the liquid component container 46. After scattering the abrasive particles 51, the polishing apparatus feeds the liquid component 52 (e.g., water) within the liquid component container 46 onto the polishing pad 42 through the nozzle 47 to create the slurry wherein the abrasive particles 51 are dispersed in the liquid component 52. In the polishing process described below, polishing is performed by using the slurry made as such. The abrasive particles 51 and the liquid component 52 are not mixed with each other, but instead the liquid component 52 is added to the abrasive particles 51 that is uniformly scattered in advance. This prevents cohering of the abrasive particles in the slurry, which can occur when the abrasive particles 51 and the liquid component 52 are directly mixed together. It is also possible to prevent an agglomerate of the cohering abrasive particles from causing scratches on the glass substrate 1 during the polishing process since the abrasive particles 51 do not cohere in the slurry. Further, since the abrasive particles 51 are uniformly scattered in advance, the abrasive particles 51 do not exist on one side in the slurry. This allows for even distribution of the abrasive particles 51 on the surface of the glass substrate 1 and therefore uniform polishing of the surface of the glass substrate 1. In some embodiments, the process of scattering the abrasive particles 51 for the slurry may be performed in a manner of scattering the abrasive particles 51 onto the buffer layer of the glass substrate 1 instead of scattering the abrasive particles 51 onto the polishing pad 42.

Next, the process of polishing the glass substrate 1 will be described. After the cleaning process and the scattering process are finished, the polishing apparatus feeds the liquid component 52 to create the slurry. Thereafter, the polishing apparatus allows the cleaner 44 to discharge the cleaned glass substrate 1. In this case, the cleaner 44 discharges the glass substrate 1 with the buffer layer created in the glass substrate 1 positioned opposite the polishing pad 42. The holder 43 holds the discharged glass substrate 1. The polishing apparatus brings the glass substrate 1 held by the holder 43 into abutment with the polishing pad 42. In this case, since the buffer layer of the glass substrate 1 is located opposite the polishing pad 42 and the slurry exists on the polishing pad 42, the buffer layer of the glass substrate 1 is brought into abutment with the polishing pad 42 via the slurry. The polishing apparatus rotates the turn table 41 and the holder 43 with the glass substrate 1 in abutment with the polishing pad 42, thereby performing the CMP to the glass substrate 1. As the turn table 41 and the holder 43 are rotated, the polishing pad 42 and the glass substrate 1 are rotated individually. Thus, the polishing pad 42 and the glass substrate 1 are rubbed against each other with the slurry therebetween and thus the glass substrate 1 are mechanically and chemically polished on and from the buffer layer.

In another embodiment, the polishing apparatus may be configured to perform a process of adding the slurry by interrupting the polishing process and then scattering the abrasive particles 51 and feeding the liquid component 52 after the polishing process proceeds to some extent. In yet another embodiment, the polishing apparatus may be configured to polish the glass substrate 1 from the buffer layer by means of conventional slurry without scattering the abrasive particles 51.

As described above in detail, according to the embodiments disclosed herein, the glass substrate 1 is polished until the buffer layer which is easier to polish than glass is abraded off Thus, the glass substrate 1 can be polished with ease. The abrasive particles contained in the slurry may cause scratches on the buffer layer. However, through the polishing process, the buffer layer is finally abraded off and it becomes more difficult for the abrasive particles to cause scratches. This suppresses the generation of scratches on the glass substrate 1.

Further, according to the embodiments disclosed herein, pre-treatments such as the creation of the buffer layer and the positron annihilation gamma ray measurement precede the CMP for the glass substrate 1, thereby suppressing the generation of scratches on the glass substrate 1 as well as the prolongation in the time necessary for polishing. Accordingly, scratchless high-quality mask blanks can be efficiently manufactured. Further, defectless high-quality photo masks for EUV exposure can be manufactured by using such mask blanks. The polishing method according to the present disclosure should not be limited to the manufacture of mask blanks. The polishing method may be used for generally polishing glass. For example, the polishing method according to the present disclosure may be used for polishing a glass-made lens.

What is claimed is:

1. A method of chemical mechanical polishing of glass using a slurry containing abrasive particles for polishing the glass and a liquid component, the method comprising:
   creating a buffer layer on a surface of the glass, the buffer layer being easier to polish by the slurry than the glass; and
   chemically mechanically polishing the glass by using the slurry until the created buffer layer is abraded off,
   wherein said creating the buffer layer includes creating a brittle layer, the brittle layer being formed by irradiating a gas cluster ion on the surface of the glass to deteriorate a vicinity of the surface of the glass, and
   wherein the brittle layer is created from the surface of the glass up to a depth such that the brittle layer contains a portion in which defects exist.

2. The method of claim 1, wherein said creating the buffer layer includes creating a coating layer, the coating layer being formed by coating the surface of the glass with a substance softer than the glass by a thickness equal to or greater than a particle diameter of the abrasive particle within the slurry, and wherein the coating layer is formed above the brittle layer and, in said chemically mechanically polishing the glass, the coating layer is abraded off and then the brittle layer is abraded off.

3. The method of claim 1, further comprising inspecting a distribution of the defects residing in a vicinity of the surface of the glass by a positron annihilation gamma ray measurement prior to said creating the brittle layer, wherein the depth is determined based on the inspection result.

4. The method of claim 1, further comprising measuring a thickness of the buffer layer by a positron annihilation gamma ray measurement after said creating the buffer layer, wherein a depth up to which said chemically mechanically polishing the glass is performed is determined based on the measurement result.

5. The method of claim 1, further comprising creating the slurry by uniformly scattering the abrasive particles on the buffer layer or a polishing implement for polishing the glass and then adding the liquid component to the scattered abrasive particles, wherein said creating the slurry is performed prior to said chemically mechanically polishing the glass.

6. The method of claim 5, further comprising cleaning the glass prior to said creating the slurry.

7. A method of chemical mechanical polishing of glass using a slurry containing abrasive particles for polishing the glass and a liquid component, the method comprising the sequential steps of:
   inspecting a distribution of defects residing in a vicinity of a surface of the glass by a positron annihilation gamma ray measurement;
   creating a buffer layer on the surface of the glass, the buffer layer being easier to polish by the slurry than the glass;
   measuring a thickness of the buffer layer by a positron annihilation gamma ray measurement;
   cleaning the glass;
   creating the slurry by uniformly scattering the abrasive particles on the buffer layer or a polishing implement for polishing the glass and then adding the liquid component to the scattered abrasive particles; and
   chemically mechanically polishing the glass by using the slurry until the buffer layer is abraded off,
   wherein said creating the buffer layer includes:
      creating a brittle layer by irradiating a gas cluster ion on the surface of the glass to deteriorate a vicinity of the surface of the glass, the brittle layer being created from the surface of the glass up to a depth, which is determined based on the inspection result of the distribution of the defects, such that the brittle layer contains a portion in which the defects exist; and
      creating a coating layer by coating the surface of the glass with a substance softer than the glass by a thickness equal to or greater than a particle diameter of the abrasive particle within the slurry, the coating layer being formed above the brittle layer, and
   wherein said chemically mechanically polishing the glass is performed up to a depth, which is determined based on the measurement result of the thickness of the buffer layer, such that the coating layer is abraded off and then the brittle layer is abraded off.

* * * * *